United States Patent [19]

Chan et al.

[11] Patent Number: 4,535,962
[45] Date of Patent: Aug. 20, 1985

[54] OBJECT HOLDING DEVICE FOR DECORATIVE STRUCTURE

[76] Inventors: David M. F. Chan, 1213 King Dr., El Cerrito, Calif. 94530; Michael L. F. Chan, 1407 Arch St., Berkley, Calif. 94708

[21] Appl. No.: 509,966

[22] Filed: Jun. 30, 1983

[51] Int. Cl.³ .............................................. E04G 3/00
[52] U.S. Cl. ................................... 248/214; 24/489; 248/215; 248/227
[58] Field of Search ............... 248/214, 215, 227, 230, 248/DIG. 7, 231.6, 231.5, 316.1, 316.8, 316.6, 201, 317; 24/489

[56] References Cited

U.S. PATENT DOCUMENTS

| | | | |
|---|---|---|---|
| 345,020 | 7/1886 | Barney | 248/214 |
| 2,516,760 | 7/1950 | Doran | 248/214 |
| 3,030,681 | 4/1962 | Phillips | 248/230 |
| 3,036,514 | 5/1962 | McDuffie | 248/230 |
| 3,530,996 | 9/1970 | Schaffer | 248/230 |
| 3,612,459 | 10/1971 | Walls | 248/215 |

Primary Examiner—Ramon S. Britts
Assistant Examiner—Ramon O. Ramirez
Attorney, Agent, or Firm—Robert R. Tipton

[57] ABSTRACT

A pair of elongated support leg members are configured to engage and hold an object by clamping around a narrow portion of the object, with the ends of the leg members defining inverted hooks which are adapted to engage and be supported by a pair of spaced apart rods or support members.

4 Claims, 6 Drawing Figures

OBJECT HOLDING DEVICE FOR DECORATIVE STRUCTURE

BACKGROUND OF THE PRIOR ART

This invention relates generally to object clamping devices and in particular to devices for clamping an object that is suspended from a decorative structure.

The object clamping device of the prior art utilized either a fixed dimension clamping device for a particular object or container, a cap with raised ribs adapted to engage the flared neck portion of the object being held, or an adjustable wire noose that engaged the narrow portion of the neck of the object.

Other methods of holding an object included the use of cords or strings wrapped around the neck of the object and tied in various special manners to achieve symmetry so that the object would hang vertically.

With the exception of the use of cords or strings, all of these prior art devices were designed for use on only one size of object and provided little adaptation to hold objects of various sizes.

SUMMARY OF THE INVENTION

The object holding device of the present invention is adapted to be versatile in holding objects having a range of neck sizes or object diameters.

To accomplish this, the object holding device of the present invention comprises, basically, a pair of elongated support leg members having the ends of each leg deformed to engage a pair of spaced apart support rods or support members and hold the elongated support leg members fixedly therebetween.

A deformed region proximate the midpoint of each support leg member is adapted to engage the object to be held with clamping members connected proximate each side of said deformed region which are adapted to hold the support leg members in a fixed relation to each other. The deformed region is configured to define a V-shape.

The elongated support leg members can be either generally parallel to each other, spaced apart by toggles members or cross over each other at an angle and attached to each other at the cross-over point by a clamping means. The variation in the spaced apart relation of the elongated support leg member can be either incremental or continuous.

It is, therefore, an object of the present invention to provide a device for holding an object.

It is another object of the present invention to provide a device for holding an object which is adjustable for various size objects.

It is a further object of the present invention to provide a device for holding an object that can be suspended from a suspended decorative structure.

It is yet another object of the present invention to provide a device for holding an object in which serrations are used to prevent movement between the object supporting legs of the object holding device.

These and other objects of the present invention will be manifest upon study of the following detailed description when taken together with the drawings.

DESCRIPTION OF THE PREFERRED EMBODIMENT

Figure 1:
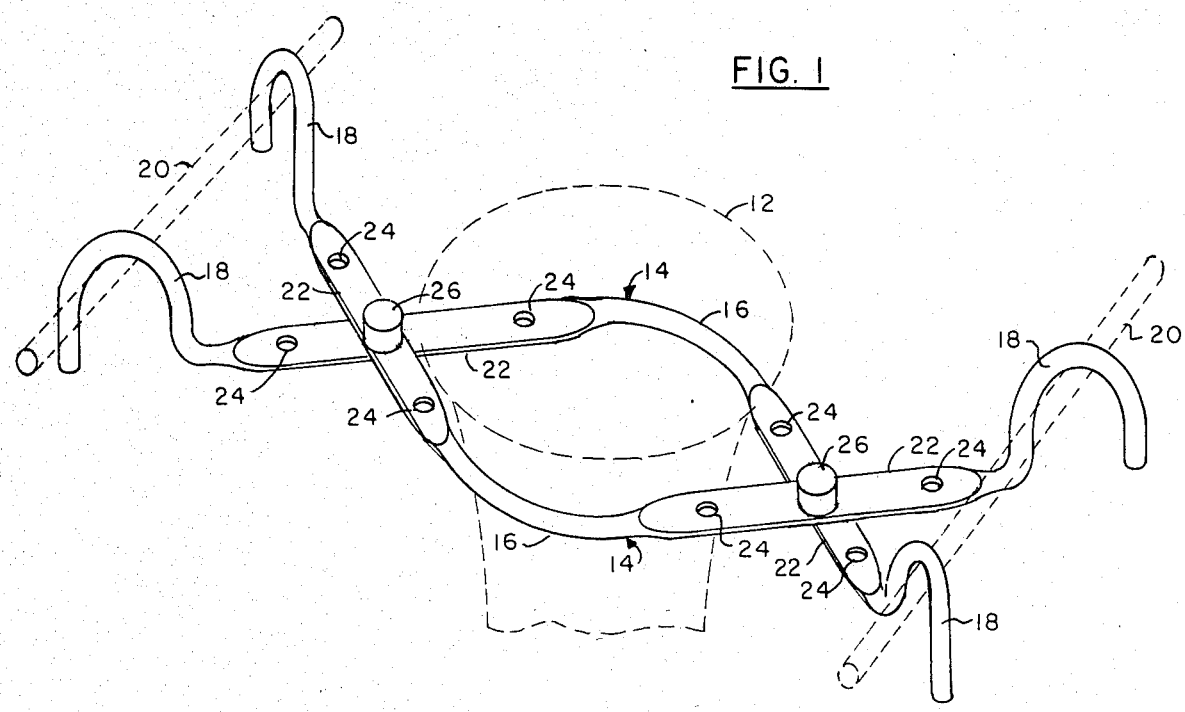
FIG. 1 is an isometric view of a first embodiment of the object holding device of the present invention.
Figure 2:
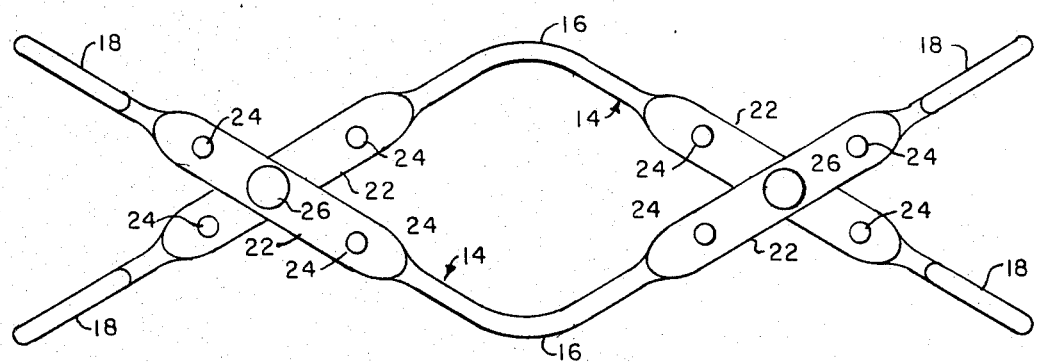
FIG. 2 is a plan view of the object holding device of the device shown in FIG. 1.
Figure 3:
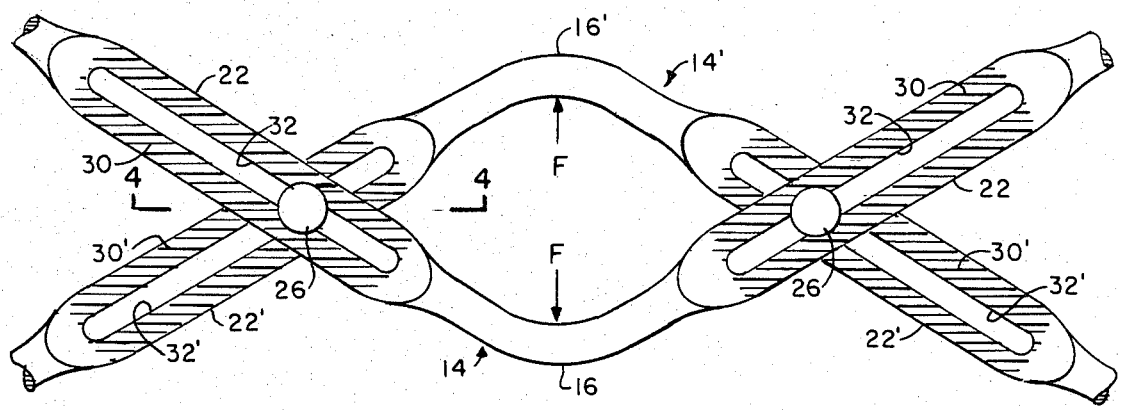
FIG. 3 is a further embodiment of the object holding device shown in FIGS. 1 and 2 illustrating a further method of holding the parts or the device in a fixed relation to each other.

With reference to FIG. 1, there is illustrated the holding device 10 of the present invention adapted to hold an object 12, shown in dashed line.

Holding device 10 comprises, basically, a first elongated support leg member 14 which, in turn, comprises a deformed region 16 proximate the midpoint of leg member 14 causing support leg member 14 to define a generally V-shape.

At each end of first elongated support leg member 14 is an inverted U-shaped hook 18 having its plane disposed perpendicular to the plane of V-shaped support leg member 14.

The inside of U-shaped hook 18 is adapted to engage and be supported by support rod or member 20, shown in dashed line, and be fixedly supported therebetween.

A flat region 22 in the straight portion of support leg 14 proximate each side of deformed region 16 is provided with spacer holes 24. Spacer holes 24 are adapted to receive clamping devices 26.

In FIG. 1, clamping devices 26 comprise a knurled head bolt or screw and nut assembly.

A like second elongated support leg 14' is provided opposite first support leg member 14. Second elongated support leg member 14' also comprises a deformed region 16' proximate the midpoint of support leg member 14' causing support leg member 14' to be deformed into a generally V-shape.

At each end of second elongated support leg member 14' is an inverted U-shaped hook 18' having its plane disposed perpendicular to the plane of V-shaped support leg member 14'.

The inside of U-shaped hook 18' is adapted to engage and be supported by rod or support member 20 shown in dashed line.

A flat region 22' in the straight portion of support leg member 14' proximate each side of deformed region 16' is provided with spacer holes 24'. The spacer holes 24' of second elongated leg member 14' are adapted to match spacer holes 24 of support leg member 14.

Where spacer holes 24 and 24' match, clamping device 26 is adapted to engage both holes and securely clamp first and second support leg members 14 and 14' together in fixed relation to each other.

In order to avoid the need for right and left hand support leg members 14 and 14', a flat region 22 can be provided on both the top and bottom side of support leg member 14 and 14'.

Since the forces acting on elongated support leg members 14 and 14' tend to force them apart, clamping device 26 must be securely tightened in order to provide sufficient contact friction forces to prevent slippage between support legs 14 and 14'.

Figure 4:
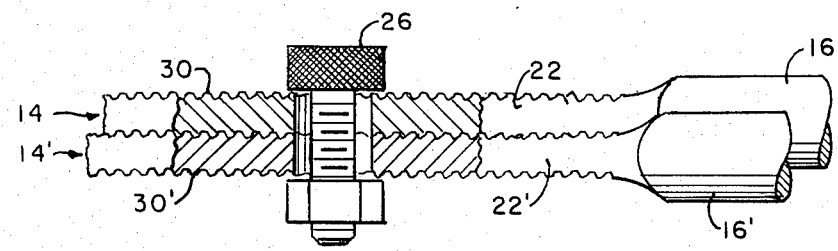
FIG. 4 is an elevational cross-sectional view of the region of engagement between the two elongated support leg members shown at lines 4—4 in FIG. 3.
Figure 5:
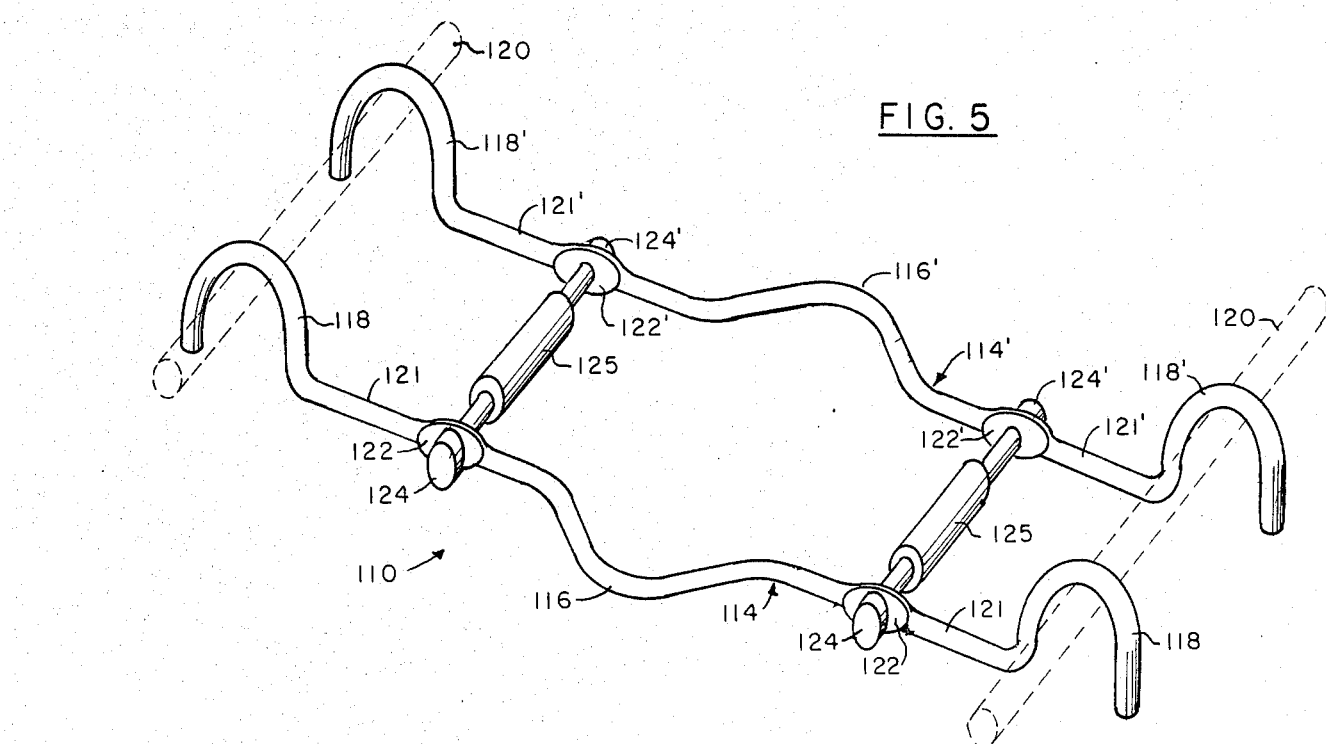
FIG. 5 is an isometric view of a second embodiment of the object holding device of the present invention.

To assist in preventing slippage between leg members 14 and 14', a plurality of serrations or ridges and depressions 30 and 30' are provided in flat region 22 as shown in FIGS. 4 and 5.

Serrations or ridges and depressions 30 and 30' are shown in FIG. 4 arranged to be generally perpendicular to the forces "F" acting on support legs 14 and 14' by the object being held which tend to force them apart.

In lieu of holes 24 and 24' utilized in the embodiment illustrated in FIG. 1, and elongated lot 32 and 32' is disposed in flat region 22 and 22', respectively.

Thus, it can be seen, that finer increments of adjustment are possible to obtain a more precise adjustment for various size objects.

Figure 6:
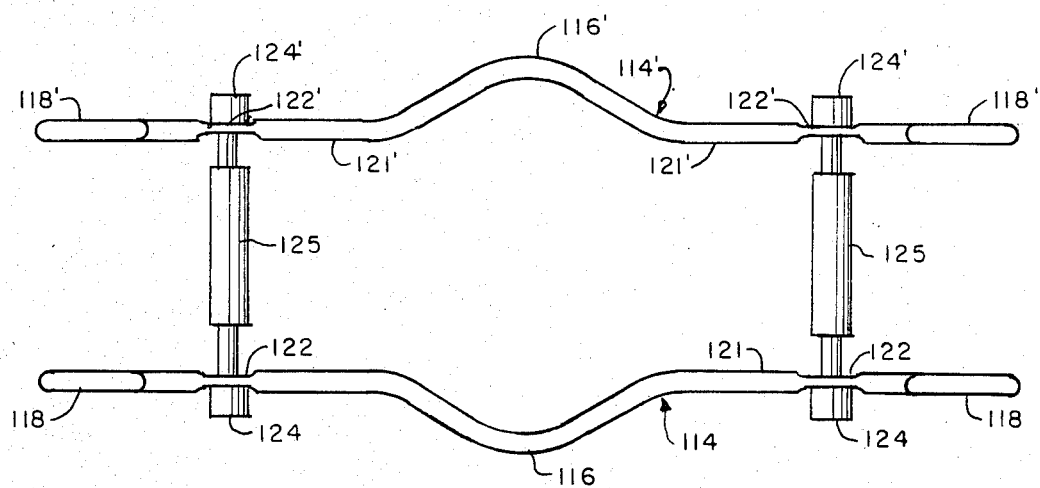
FIG. 6 is a plan view of the object holding device shown in FIG. 5.

With reference to FIGS. 5 and 6, a further embodiment of object holding device 110 of the present invention is illustrated. Object holding device 110 comprises, basically, a first elongated support leg member 114 which, in turn, comprises a generally V-shaped deformed region 116 proximate the midpoint or support leg 114 and a pair of inverted U-shaped hook 118 proximate each end of elongated support legs 114 distal deformed region 116 and have a their plane disposed perpendicular to the plane of V-shaped deformed region 116.

The inside of U-shaped hook 118 is adapted to engage and be separated by support rods or members 120 shown in dashed line, and be fixedly supported therebetween.

Straight regions 121 proximate each side of V-shaped region 116 between U-shaped hook 118 are arranged to longitudinally aligned so that they will be parallel to a like elongated support leg member 114' disposed opposite to it as shown in FIG. 6.

A flat region 122 in straight portion 121 of support leg 114 having hole therethrough is adapted to receive machine screw 124 which is shown engaging toggle 125.

A second elongated support leg member 114' is provided opposite first support leg member 114 and comprises, basically, a generally V-shaped deformed region 116' proximate the midpoint or support leg 114' and a pair of inverted U-shaped hooks 118' proximate each end of elongated support legs 114' distal deformed region 116' and have a their plane disposed perpendicular to the plane of V-shaped deformed region 116'.

The inside of U-shaped hook 118' is adapted to engage and be separated by support rods or members 120 shown in dashed line, and be fixedly supported therebetween.

Straight regions 121' proximate each side of V-shaped region 116' between U-shaped hook 118' are arranged to be longitudinally aligned so that they will be parallel to like elongated support leg member 114 disposed opposite to it as shown in FIG. 6.

A flat region 122' in straight portion 121' of support leg 114' having hole therethrough is adapted to receive machine screw 124' which is shown engaging toggle 125.

The length of toggle 125 is arranged to permit a predetermined minimum size object to be held between V-shaped regions 116 and 116'. The length of machine screws 124 and 124' are arranged to allow a predetermined maximum size object to be held between V-shaped regions 116 and 116'.

The rotation of machine screws 124 and 124' allow the spacing between support legs 114 and 114' to be continuously adjustable.

Thus is disclosed a device for holding an object.

We claim:

1. The device for holding an object comprising
   a first end support member,
   a second end support member spaced apart from said first end support member,
   a first generally V-shaped object support member having its apex proximate the midpoint thereof with a first pair of legs extending at an angle to each other from said apex,
   a second generally V-shaped object support member having its apex proximate the midpoint thereof with a second pair of legs extending at an angle to each other from said apex,
   said first pair of legs adapted to cross over and engage said second pair of legs,
   means for connecting said first pair of legs to said second pair of legs proximate the point of engagement,
   means proximate each end of said outwardly extending first and second pair of legs distal said apex for respectively engaging said first and second support member.

2. The device for holding an object as claimed in claim 1 wherein
   said first pair of legs further comprises
   a first generally flat region disposed on each of said legs between said apex and said means for engaging first and second end support members, and
   wherein said second pair of legs further comprises
   a second generally flat region disposed on each of said legs between said apex and said means for engaging said fist and second end support members,
   said first generally flat region on said first pair of support legs adapted to engage said second generally flat region on said second pair of support legs,
   said means for connecting said first pair of support legs to said second pair of support legs proximate said point of engagement further comprising
   means defining a hole in each of said legs proximate the point of engagement, and
   means adapted to engage said hole and compress said first flat region against said second flat region.

3. The device for holding an object as claimed in claim 2 further comprising
   a plurality of first serrations disposed in the surface of said first generally flat region, and
   a plurality of second serrations disposed in the surface of said second generally flat region, said first and second serrations aligned to engage each other and hold said V-shaped first and second leg members in fixed relation to each other.

4. The device for holding an object as claimed in claim 2 further comprising
   a first elongated slot disposed in said first generally flat region,
   a second elongated slot disposed in said second generally flat region, and
   means adapted to engage said slot for holding and compressing said first and second flat regions together.

* * * * *